April 14, 1925.

V. H. TODD

ELECTRICAL MEASURING INSTRUMENT

Filed May 3, 1919

1,533,356

WITNESSES:
H. J. Shelhamer
J. H. Procter

INVENTOR
Victor H. Todd
BY
Wesley G. Carr
ATTORNEY

Patented Apr. 14, 1925.

1,533,356

UNITED STATES PATENT OFFICE.

VICTOR H. TODD, OF RAINBOW LAKE, NEW YORK.

ELECTRICAL MEASURING INSTRUMENT.

Application filed May 3, 1919. Serial No. 294,568.

*To all whom it may concern:*

Be it known that I, VICTOR H. TODD, a citizen of the United States, and a resident of Rainbow Lake, in the county of Franklin and State of New York, have invented a new and useful Improvement in Electrical Measuring Instruments, of which the following is a specification.

My invention relates to measuring devices and particularly to volt-ampere meters.

One object of my invention is to provide a device that shall have means whereby out-of-phase currents may be readily mathematically combined.

Another object of my invention is to provide a device of the above indicated character that may be used to indicate the product of the voltage and current of an alternating-current circuit.

A further object of my invention is to provide a measuring device, of the above indicated character, that shall be simple and inexpensive to construct and effective in its operation.

In practicing my invention, I provide a Wheatstone bridge having four arms of substantially equal resistance one of which comprises two parallel-connected resistors. An indicating instrument is connected across two of the normally equal-potential points of the bridge, and a thermo-couple, that is heated in accordance with the current of the circuit, is connected across the other points of the bridge. The equal-potential points of the parallel-connected resistors are connected across the circuit to thus cause the same to be traversed by a current proportional to the voltage traversing the circuit. With this arrangement, the indicating instrument of the bridge will not deflect unless voltage is impressed across the parallel-connected resistors and, if the voltage is impressed across the parallel-connected resistors and no current traverses the circuit, the instrument will not deflect. However, if voltage is impressed on the circuit and current traversing the same, the instrument will deflect in accordance with the product of the squares of the current and voltage. Thus, the volt-amperes traversing the circuit may be readily ascertained by an ordinary direct-current instrument that is properly calibrated.

Figure 1:
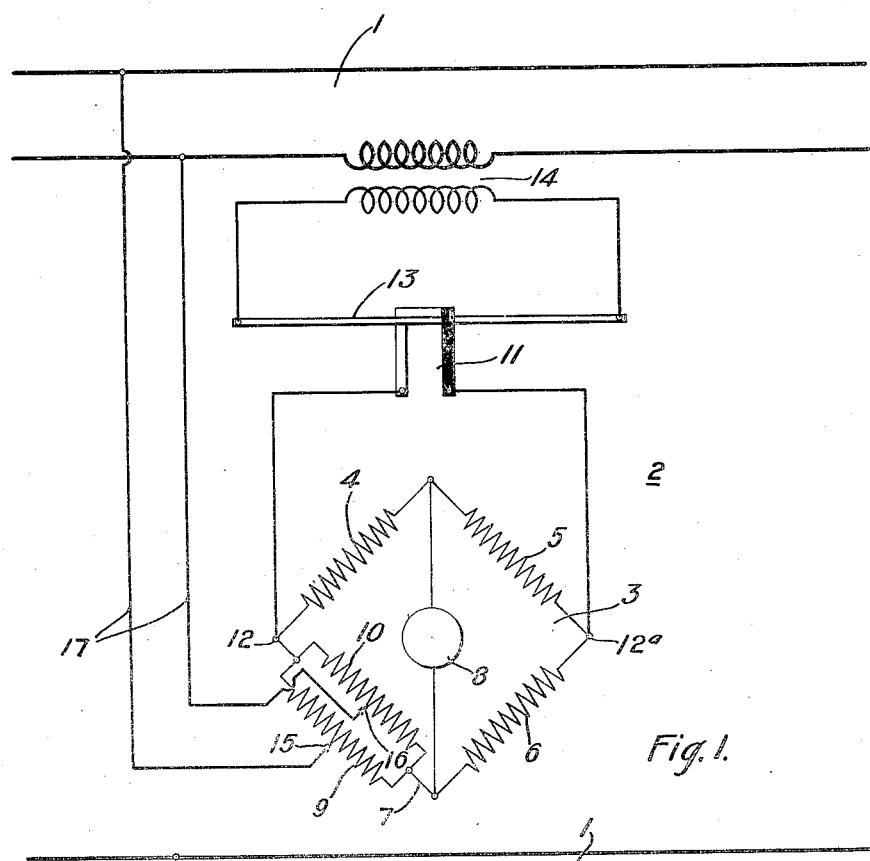
Figure 2:
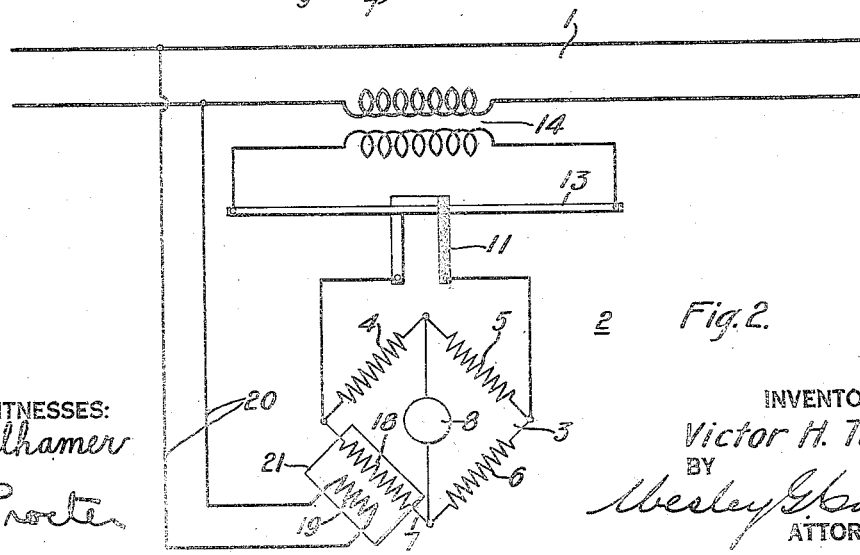

Figure 1 of the accompanying drawings is a diagrammatic view of a measuring instrument embodying my invention, and Fig. 2 is a diagrammatic view of a modified form of instrument embodying my invention.

An alternating-current circuit 1 is provided with a measuring instrument 2 for the purpose of ascertaining the volt-amperes traversing the same.

The instrument 2 shown in Fig. 1 of the drawings comprises, in general, a static network, such as a Wheatstone bridge 3 having four arms 4, 5, 6 and 7, and a direct-current indicating instrument 8. The arm 7 comprises two resistors 9 and 10 connected in parallel and of such resistance that the arms 4, 5, 6 and 7 of the bridge shall be normally so balanced that the instrument 8 does not deflect. A thermo-couple 11 is connected to the points 12 and 12ª of the bridge and is disposed adjacent a heater 13 that is heated, by means of a transformer 14, in accordance with the square of the current traversing the circuit 1. The equal-potential points 15 and 16 of the resistors 9 and 10, respectively, are connected, through conductors 17, across the circuit 1.

If the conductors 17 are not connected to the circuit 1, the instrument 8 will not deflect, irrespective of the value of current traversing the circuit 1 and, similarly, if the thermo-couple 11 is disconnected from the bridge 3 and the conductors 17 are connected to the circuit 1, the resistors 9 and 10 will be heated in accordance with the square of the electro-motive force of the circuit 1 but the instrument 8 will not deflect. However, if electromotive force is applied at the points 12 and 12ª of the bridge 3, and the temperature of the resistors 9 and 10 varies in accordance with the square of the electromotive force of the circuit 1, it will be seen that the resistance of the arm 7 will vary in accordance with the square of the electromotive force of the circuit 1. Also, if the current traversing the circuit 1 changes, the deflection of the instrument 8 will vary in accordance with the square of the current traversing the circuit 1. In other words, the instrument will indicate in accordance with the product of the square of the voltage and current traversing the circuit. Thus, if the instrument 8 is calibrated in conformity with a scale that varies as the square of the indications, it will indicate directly the volt-amperes traversing the circuit 1.

In the modification shown in Fig. 2 of the drawings, the arm 7 of the bridge 3 comprises a resistor 18 and a heating coil 19 that is connected, through conductors 20, across the circuit 1. The resistor 18 and the coil 19 may be disposed in a receptacle 21 to thus cause the resistance of the resistor 18 to be directly responsive to the heat imparted by the coil 19. With this arrangement, the instrument 8 will be deflected in accordance with the product of the square of the electromotive force and current traversing the circuit.

My invention is not limited to the particular arrangements illustrated, as it may be variously modified within the spirit and scope of the invention, as set forth in the appended claims.

I claim as my invention:

1. A device for measuring the product of two electrical quantities comprising an indicating measuring instrument having a single-quantity-responsive element, a Wheatstone bridge and means for so affecting the bridge in accordance with the two quantities and for so connecting the instrument to the bridge that the instrument indicates the product of the two quantities.

2. A device for measuring the product of two out-of-phase currents comprising a Wheatstone bridge, means for energizing the same in accordance with the value of one of said currents across opposite points of the bridge and means for varying the resistance of one arm of the bridge in accordance with the value of the other current.

3. A volt-ampere meter for an alternating-current circuit comprising indicating means, actuating means therefor responsive to a single quantity and means including a Wheatstone bridge between the circuit and the instrument for varying said quantity in accordance with the volt-amperes of the circuit.

4. A volt-ampere meter for an alternating-current circuit comprising a Wheatstone bridge having one arm thereof composed of two parallel-connected resistors of higher temperature co-efficient than the other arms, means for applying a voltage across the bridge that is proportional to the current traversing the circuit and a voltage across equal-potential points of the parallel-connected resistors that is proportional to the electromotive force of the circuit.

5. A device for measuring a quantity including the product of the volts and the amperes traversing an alternating-current circuit comprising a Wheatstone bridge, means for changing the balance of the bridge in accordance with one of the factors of said product and means for energizing the bridge in accordance with the other factor of said product.

6. The combination with circuits having out-of-phase currents, of an indicating instrument, a Wheatstone bridge, one arm of which consists of two parallel-connected resistors, and temperature-responsive connections between said bridge and said circuits to cause the indicating instrument to indicate in accordance with the product of the squares of the currents.

7. In an alternating-current circuit, the combination with a Wheatstone bridge one arm of which consists of two parallel-connected resistors having a higher temperature co-efficient than the other arms, of a heater connected to the circuit to be heated in accordance with the current traversing the same, a thermo couple associated with the heater and connected across the bridge, and means for supplying voltage from the circuit to equal-potential points on the parallel-connected resistors.

8. A measuring device for an alternating-current circuit comprising a Wheatstone bridge, means for varying the resistance of one of the arms thereof in accordance with variations in the electromotive force of the circuit and means for causing a drop in potential across the bridge in accordance with the current traversing the circuit.

9. A measuring device for an alternating-current circuit comprising a Wheatstone bridge, means for changing the balance of the bridge in accordance with the electromotive force of the circuit and means for operatively connecting the terminals of the bridge to the circuit.

10. A measuring device for an alternating-current circuit comprising a Wheatstone bridge, means for changing the balance of the bridge in accordance with the electromotive force of the circuit and means for energizing the bridge only when current traverses the circuit.

11. A measuring device for an alternating-current circuit comprising a normally balanced Wheatstone bridge, means for causing the bridge to be unbalanced in accordance with the electromotive force of the circuit and means for energizing the bridge in accordance with the current traversing the circuit.

12. A measuring device for alternating-current circuits comprising a Wheatstone bridge, means for changing the balance of the bridge in accordance with one alternating-current-circuit quantity and means for energizing the bridge in accordance with another alternating-current-circuit quantity.

In testimony whereof, I have hereunto subscribed my name this 12th day of April 1919.

VICTOR H. TODD.